(12) United States Patent
Thayer et al.

(10) Patent No.: US 8,041,517 B2
(45) Date of Patent: Oct. 18, 2011

(54) SPATIO-TEMPORAL AND CONTEXT-BASED INDEXING AND REPRESENTATION OF SUBTERRANEAN NETWORKS AND MEANS FOR DOING THE SAME

(75) Inventors: Scott M. Thayer, Pittsburgh, PA (US); Carlos Felipe Reverte, Miami, FL (US); Eric C. Close, Sewickley, PA (US); Prasanna Kumar Velagapudi, Suffern, NY (US); William Ommert, Swissvale, PA (US)

(73) Assignee: RedZone Robotics, Inc., Pittsburgh, PA (US)

(*) Notice: Subject to any disclaimer, the term of this patent is extended or adjusted under 35 U.S.C. 154(b) by 989 days.

(21) Appl. No.: 11/627,334

(22) Filed: Jan. 25, 2007

(65) Prior Publication Data

US 2007/0195712 A1 Aug. 23, 2007

Related U.S. Application Data

(60) Provisional application No. 60/762,371, filed on Jan. 25, 2006.

(51) Int. Cl.
*G01B 5/00* (2006.01)
(52) U.S. Cl. .......................................... 702/33; 73/592
(58) Field of Classification Search .............. 702/33–40; 73/592, 598, 600; 348/84, 125; 382/141
See application file for complete search history.

(56) References Cited

U.S. PATENT DOCUMENTS

| | | | | |
|---|---|---|---|---|
| 5,063,780 A | * | 11/1991 | Landry et al. | 73/622 |
| 5,742,517 A | * | 4/1998 | Van Den Bosch | 382/141 |
| 6,175,380 B1 | | 1/2001 | Van Den Bosch | |
| 6,243,657 B1 | * | 6/2001 | Tuck et al. | 702/150 |
| 2003/0198374 A1 | | 10/2003 | Hagene et al. | |
| 2003/0216836 A1 | | 11/2003 | Treat et al. | |
| 2004/0175235 A1 | * | 9/2004 | Whittaker et al. | 405/51 |

* cited by examiner

*Primary Examiner* — Manuel L Barbee
(74) *Attorney, Agent, or Firm* — Reed Smith LLP (57) ABSTRACT

Systems, methods and devices for indexing, archiving, analyzing and reporting pipe and other void network data. Specifically, multi-dimensional indexing and correlation of spatial, temporal, feature, environmental, uncertainty and/or context-based data is synchronized, indexed and analyzed across a wide variety of pipe networks at various times. The present invention preferably includes data represented at several different levels of reference including: referenced to the sensor with which it was collected; referenced to the robot or platform upon which the sensor is attached; and the world. The structure and functionality of the system provides for extensive querying, trouble-shooting and predictive analysis for pipe networks.

19 Claims, 6 Drawing Sheets

SPATIO-TEMPORAL AND CONTEXT-BASED INDEXING AND REPRESENTATION OF SUBTERRANEAN NETWORKS AND MEANS FOR DOING THE SAME

CROSS-REFERENCE TO RELATED APPLICATION

This application claims the benefit under 35 U.S.C. §119 (e) of the earlier filing date of U.S. Provisional Application Ser. No. 60/762,371 filed on Jan. 25, 2006.

BACKGROUND OF THE INVENTION

1. Field of the Invention

The present invention relates generally to systems and methods for indexing, archiving, analyzing and reporting pipe and other void data, and more specifically, the present invention is directed to the multi-dimensional indexing and correlation of spatial, temporal, feature and context-based data in pipe and other void networks.

2. Description of the Background

In modern society, there are a great variety of existing and planned networks of pipes and other voids that are used for a wide variety of tasks. In most instances, these pipes degrade over time and are periodically inspected and/or repaired in order to extend the useful life of the pipes. In the present application, the term "pipe" or "pipeline network" will be used to represent all forms of voids and/or networks of voids characterized by at least partially hollow channels through which a robot or other inspection platform may travel. A convenient example used herein is a subterranean network of pipes used for sewers or potable water as is well known to those skilled in the art, but the present invention is not limited to such networks.

Current inspection platforms, for examining and cataloging the internal features of pipeline networks or other networks of voids, typically utilize sensors attached to a mobile base that is tethered to a remote control and data collection station at the surface (for subterranean networks). Sensing is primarily accomplished by imaging sensors such as cameras, lasers and sonar which collect data that is referenced to the tether payout length. This payout length is presumed to represent the current linear offset of the inspection device from the point of ingress into the pipe network. This method results in a pipe data model that utilizes discrete coordinate frames that are derived from data acquisition positions that are referenced to this payout or linear footage of ingress.

Figure 1:
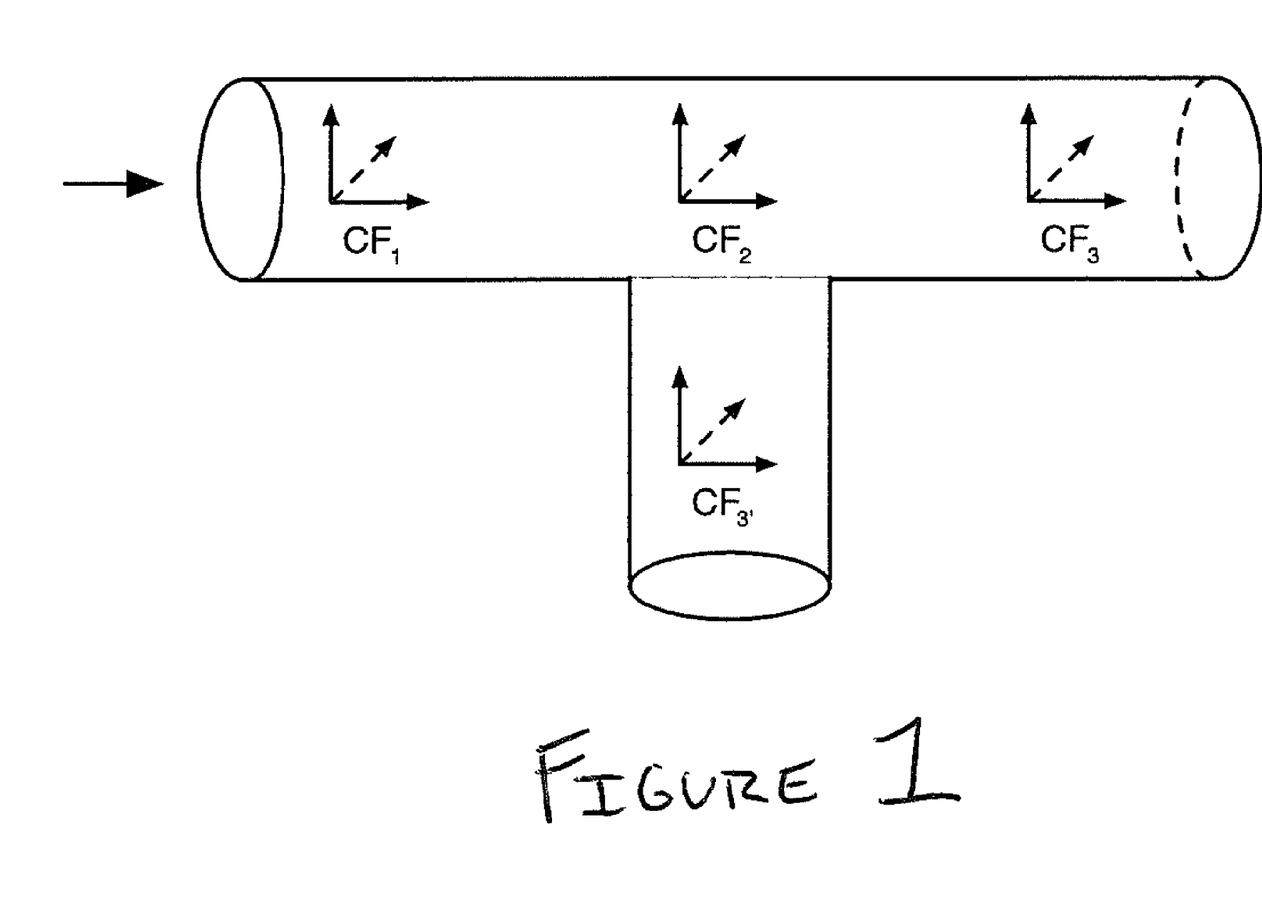
FIG. 1 shows an exemplary pipe network with a series of coordinate frames representing different locations of an inspection device.

However, this is an insufficient model because pipe systems are not one-dimensional, straight networks. Rather, as represented by FIG. 1, pipe systems are typically large, complex networks with many interconnected segments and joints. As represented by the moving coordinate frame (CF) in FIG. 1, as each sensor onboard the inspection device traverses this network, linear footage cannot fully represent the sensor's path through the system as it passes by and through various branches and forks in the pipe. Specifically, as the sensor moves from position $CF_1$ to position $CF_2$ (at the junction of two pipes), the inspection device may travel in either of two directions (represented by $CF_3$ and $CF_3$, in FIG. 1).

Therefore, as shown in FIG. 1, when a sensor encounters a branch in the pipe, footage indexed data becomes ambiguous because points along two or more forward paths will share the same footage values. Specifically, the $CF_3$ and $CF_3$, positions would be characterized by the same payout length, and are therefore ambiguous. Clearly, as more complex pipe networks are explored, the ambiguity problem quickly multiplies and renders the collected data almost meaningless.

Similarly, traditional mobile inspection platforms for inspecting pipe and other void networks utilize a primitive system of fusion between data collected from different sensors. Traditionally, each sensor is sampled and recorded individually, resulting in one or more individual data streams which represent an inspection run. If more than one data stream is collected, the streams may be fused or logically cross-referenced at a data viewer, but there are no inherent links between the various collected data types.

In short, data from multiple sensors may be statically combined in real-time by combining the two streams into a single modified stream (as in the case of adding well-known "screenwriting"), or may be logically combined at a later time (as in the case of annotated image streams). In either case, it is difficult if not impossible to later extricate the "merged" data streams from one another. Moreover, dynamically adding or altering the data types stored in a stream, which is especially useful when analyzing multiple environmental sensors that are recording data on similar spatial locations, is impractical and not currently employed under these traditional systems.

Since there is no way to cross-reference these resultant data streams aside from logical relationships, it is difficult to analyze disparate data streams. In practice, multiple inspection runs with imaging sensors are typically compared qualitatively using feature identification and matching, either by a human or autonomous agent. However, in employing this methodology, a large amount of information about pipe condition is lost due to the insufficient precision of these qualitative comparisons. It has therefore typically been deemed necessary to fuse individual data streams during inspection to better extract information from many individual collection runs and/or many different sensors.

Error modeling is also not addressed by this current data collection model. Each sensor has limits in accuracy that will accumulate and affect other sensor data when multiple data streams from different sensors are fused together. For example, stretch in cables (e.g., payout tethers) can distort measurements of distance, and inaccuracy in position can cause deviations in the expected perspective of imaging equipment. This information is critical in estimating the accuracy of any quantitative data analyses that utilize these sensors, and must be included with the sensor data.

Thus, traditional systems and methods for collecting and analyzing pipe inspection data do not adequately correlate disparate data sets and do not address error modeling. By correlating and indexing various pipe data, the present invention provides more thorough and more reliable data analysis and even provides new types of analysis not heretofore possible. Moreover, the present systems and methodologies are applicable to a wide variety of voids other than the subterranean pipeline networks described herein. For example, the present devices and methodologies could be used with pipes, caves, tunnels, tanks, pipelines, conduits, trenches, subterranean voids, and/or wells, among others.

SUMMARY OF THE INVENTION

Multi-dimensional indexing ("MDI") of pipe data involves the cross-referencing and correlation of different data sets to allow comprehensive and thorough analysis of pipe networks. Different types of data such as spatial, contextual, environmental, feature, and/or uncertainty data, which may be collected at one time or at different times (i.e., temporally-specific data) may be collected and correlated to each other. This combined data can then be used to analyze pipe conditions, predict potential problems, and recommend actions for maintenance and/or repair. At the same time, the precise nature of the data along with its flexibility of applications provide the present devices, systems and methods with great advantages over prior art systems that lack the comprehensiveness of the present invention.

For example, in its many preferred embodiments, the present invention preferably includes the capture, storage, correlation and use of a wide variety of different data types. In a preferred embodiment, these data types include spatial data (e.g., a particular location's distance from a particular pipe joint), temporal data (e.g., the time at which data was acquired), contextual data (e.g., repair history of a pipe segment), environmental data (e.g., hydrogen sulfide gas levels within the pipe), feature data (e.g., cracks, size of cracks), and uncertainty data (e.g., error associated with a given data measurement). Through the simultaneous use of all of these disparate data types as applied to discrete "frames" or blocks of data, the present invention provides a complete and comprehensive characterization of a pipe segment or pipeline network.

After the data streams are stored and correlated to each other, the data can be retrieved by querying the data store for particular data values or ranges, or combinations of data values or ranges. For example, a query for data from pipe locations with cracks (feature data) from a January 23 pipe inspection (temporal data) will not only return this queried data, but will also retrieve all other data (spatial, context, environmental, uncertainty) associated with cracks identified during the January 23 inspection. The retrieved data can then be analyzed, for example, to determine any correlation between the other data and the presence of cracks.

Traditional systems that do not use this comprehensive data method are very limited. For example, consider a pure temporal analysis in which data from a first pipe inspection is compared to data from a later inspection of the same pipe. Such a traditional comparison fails to recognize changes to spatial data (e.g., movement of pipes due to ground settling and/or relining operations that add material to the inside of a pipe), contextual data (e.g., replacement or repair of a pipe segment), and environmental data (e.g., sensor-based readings such as hydrogen sulfide gas levels within the pipe, pH or water quality). Each of these unaccounted for types of data may be important when comparing pipe network data. Combining temporal (time-specific) data into these various data sets, along with feature data (e.g., cracks, size of cracks) and error data (e.g., data regarding the accuracy of each data reading) provides a tool for more comprehensive and accurate analysis (both predictive and retrospective) of pipe conditions.

In its many disclosed preferred embodiments, the present invention provides systems, devices and methods for multi-dimensional indexing of various data related to pipes. The combination and correlation of disparate data sets allows for assessment of pipe conditions, observation of trends and data correlations associated with pipe damage or failure, and recommendations for maintenance and repair operations.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

The present invention, in a variety of preferred embodiments, provides multi-dimensional indexing ("MDI") of various data related to pipes. MDI involves the correlation of disparate data sets, including spatial, temporal, contextual, environmental, feature, and/or uncertainty information. All of this information for a wide array of pipe segments is correlated together and then stored in a data store to be later used through a query or other data analysis technique. As a preliminary matter, each of these types of data will be explained in more detail.

Types of Data and "Data Frames"

"Spatial" data can relate to a pipe's location in the earth (e.g., in Pittsburgh, latitude and longitude coordinates, fifteen feet below the surface) or the position of particular locations within a pipe relative to other locations within the pipe (e.g., ten feet from the ingress point, five feet southwest of joint X). Either absolutely or relative to some other physical location, spatial data preferably deals with physical location aspects of the pipe or other void. Sonar, laser, calipers, odometer, gyro's, and inertial measurement units (IMUs) are all examples of sensors that provide spatial data. Moreover, any type of image data (such as that collected from cameras or radar) can be spatial in terms of its underlying mapping, be it 2-dimensional, 3-dimensional or otherwise represented.

"Temporal" data refers to time-based or time-specific data. Temporal data is typically characterized as either "micro-time" data or "macro-time" data. Micro-time data is recorded, for example, at the milli-, micro-, or nano-second level and it can be used for data averaging to increase the accuracy of sensed data. Macro-time data is recorded, for example, at longer intervals such as hours, days, or years and may be used in conjunction with other data to analyze trends and changes in pipe condition over time. Both micro and macro-time data is important to different situations. Time data may be acquired from simple devices such as calendars (for macro-time data) or from analog or digital clocks/timers of varying degrees of precision for smaller time scales.

"Contextual" data refers to information about a pipe's history, surroundings, and/or use that may impact the analysis of other data. It may also describe applicable characteristics of the sensors used to acquire the data, the platform upon which the sensors are employed and/or the operator or automated controller managing the data-gathering operation. Among other things, contextual data might include a pipe's history (e.g., pipe segment A has been repaired five times in the last three years, pipe segment B was completely replaced in 2005, pipe segment C is seventy years old), information about a pipe's environment (e.g., type of soil in which a pipe is buried, climate data), data related to pipe pressure (e.g., average volume carried, peak flow rates, population density of area serviced by pipe). All of these contextual data can impact data analysis. For example, damage in a pipe that has been frequently repaired might indicate that a different type of repair should be used or that an undiagnosed problem with the pipe material exists. Likewise, damage in a pipe section under a low pressure may be considered insignificant, while the same damage in a pipe section under high pressure might require immediate repair.

Environmental data includes readings about the internal and external environment of the pipe network that can be sensed. It is distinguishable form contextual data (which may also describe a pipe's environment) in that environmental data is actually sensed. Some examples of environmental sensor data include water quality, pH levels and gas concentrations (e.g., hydrogen sulfide gas concentration within the pipe). Again, this environmental data is useful in the later analysis of the data because it may account for differences in what otherwise should be similarly-situated pipe sections.

"Feature" data can include information related to features identified during inspection and features useful for mapping and navigating pipe networks. Feature data can include an identification and description of common types of damage (e.g., cracks, corrosion), as well as data related to obstructions within the pipe as well as the location and characteristics of pipe joints, manholes and egress points. The correlation and indexing of feature data with other data types provides a useful tool for organizing data, analyzing correlations between features and other data (e.g., analyzing the relationship between frequency of cracks and location within a pipe network), and mapping networks using features as landmarks. Feature data can be either quantitative or qualitative, such as cracks that are identified by lasers or camera-based image data. Often, feature data overlaps with a certain subset of spatial data.

Finally, "uncertainty" data includes information on the error associated with other data and particularly the error associated with the sensors that collect this other data. For example, uncertainty data might include the error associated with inertial measurement unit drift in position data, or the error associated with stretch in a tether cable used for linear distance payout data.

Many of these various data types can be collected via sensing robots deployed into pipe networks for inspections. Sensors collect spatial, environmental, temporal, and/or feature information in either discrete or continuous blocks of information. A sonar datum, for example, may be a single data point corresponding to a single range measurement along its rotation. An analog sound recording datum, on the other hand, may consist of an entire waveform spanning the length of the inspection. Pragmatically, however, both of these data are finite in length and information content, and thus still form discrete units for the purposes of the invention. More importantly, as described below, the system itself parses this data into discrete data frames that allow for many of the advanced features of the present invention.

In addition to this directly-sensed data, the present invention also allows for the entry of additional known data or metatag information to be incorporated into the data store. For example, certain contextual data can be obtained from other sources such as the pipe network owner or operator who may have additional knowledge about the history of the pipe network. Also, uncertainty data, such as sensor error values, can be derived from the instrumentation used to collect the data. The addition and cross-referencing of this data with the disparate sensed data types allows for thorough and comprehensive analysis of pipe conditions. Further, predictive analysis based on data trends or statistical correlations may lead to preventive measures or other recommendations for maintenance or repair.

Generally speaking, correlated data sets allow for additional analysis that is not possible prior to such correlation. For example, data sets obtained from inspection of the same space at different times can be compared to examine changes that may have occurred between inspections. Without accurately correlating spatial data from an inspection at time T1 to spatial data from another inspection at time T2, data from the two inspections cannot be properly analyzed together.

Correlation of different data types at times T1 and T2 also inform the analysis of any changes that may have occurred between times T1 and T2. For example, the process of spatial registration maps spatial data from time T1 to spatial data from time T2 to ensure comparisons between the spatial data sets actually involve data from the same locations within a pipe network. This spatial registration process can utilize feature data to correlate the spatial data by using features such as landmarks, joints and other distinguishable characteristics to map a pipe network. Spatial registration can also utilize uncertainty data in determining the correlation between spatial data at time T1 and at time T2.

Context data such as known maintenance or repairs between times T1 and T2 also informs data analysis. For example, take a situation in which section A of a pipe is replaced between times T1 and T2, while section B of the same pipe is not replaced. At time T2, the same amount of damage is identified in both sections A and B. Without contextual information (i.e., that section A is newer than section B), a reasonable conclusion would be that sections A and B are deteriorating at the same rate. Correlation of the contextual data with the spatial and temporal data (i.e., section A (spatial data) was replaced (contextual data) between T1 and T2 (temporal data)), however, reveals that section A is actually deteriorating faster than section B.

Another concept that is central to the present application is the use of "data frames" or discretized groupings of data that can be correlated and analyzed in a wide variety of ways. As described in more detail below with respect to FIG. 3, the collected and inferred data is correlated to matching data within a relational database (or other suitable computer device). In order to maximize the potential usefulness of this data at a later analysis stage, the data is preferably normalized to a variety of different local and world-based reference frames.

Initially, when data is collected by a sensor, it clearly is collected in relation to the reference frame of the sensor itself. This is referred to as a "Level 1" data in FIG. 3. The usefulness of this data decreases as a user attempts to correlate this data with other data streams that are not collected by this same sensor at the same time, but it is useful in that it is the baseline, initial sensor readings (i.e., pure data).

However, for some applications, it is useful to have the data referenced to the robot or other platform on which the data is collected. For example, if more than one sensor is attached to the robot and collecting data, it is convenient to normalize data from both sensors to the robot/platform such that the data streams can be easily merged and correlated. Since there is some disconnect between the sensor and the moving platform, this normalization process has to take into account the movement of the sensor relative to the platform/robot. This data normalized to the robot is referred to as "Level 2" data in FIG. 3.

Figure 3:
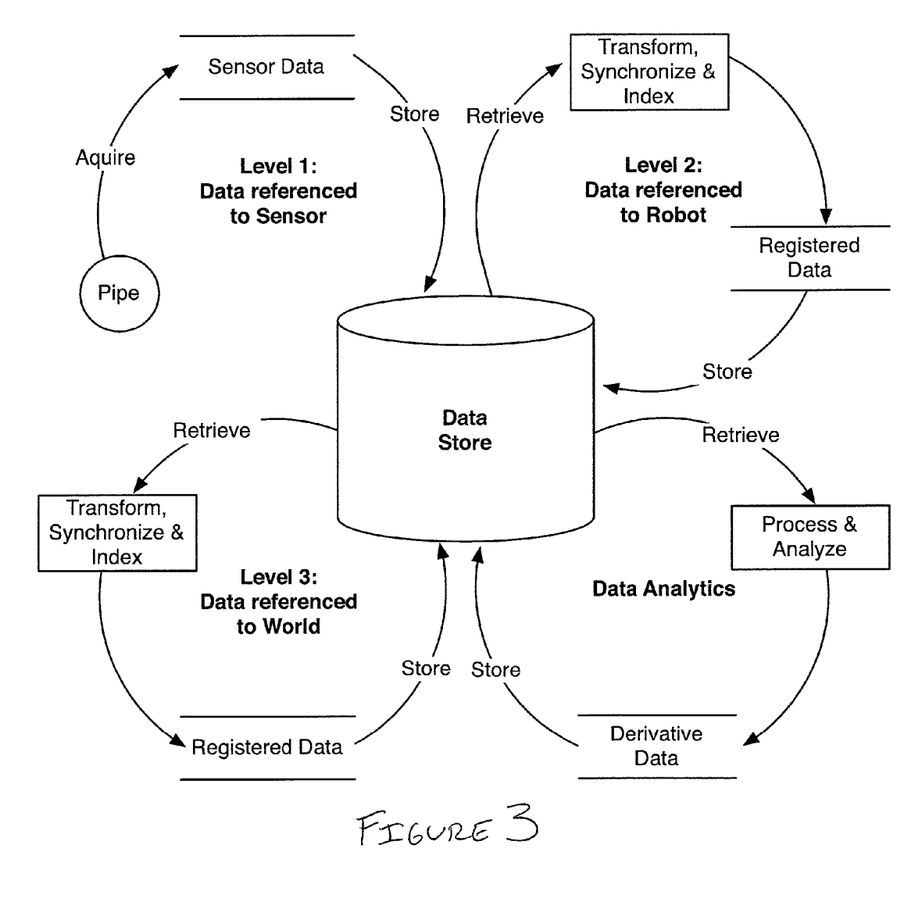
FIG. 3 is a flow diagram of the basic data acquisition and processing steps of the present invention showing several available levels of data registration.

Finally, the FIG. 3 diagram shows a third level of data that is also stored in the data store along with the aforementioned first and second level data. This "Level 3" data is normalized to the "World" or some external point of reference to which all data in all areas at all times may be correlated and normalized. This data is very useful for general comparisons and industry trends, but it may be less useful in certain focused, localized queries. Through the creation, storage and use of data in a variety of different reference frames (in data frame format), the applications of the present invention increase greatly over the existing technologies.

The Multi-Dimensional Indexing System

The above discussion sets forth the major types of data and general advantages of each data type with respect to the present invention. Hereafter, a discussion of the multi-dimensional indexing system itself will be provided. This discussion is keyed to the generalized flow charts of the system as set forth in FIGS. 2 and 3. The following discussion will follow the flow of the system from sensor data collection, through data synchronization and indexing, and finally to data processing and analysis.

System Basics, Data Frames and Reporting

Figure 2:
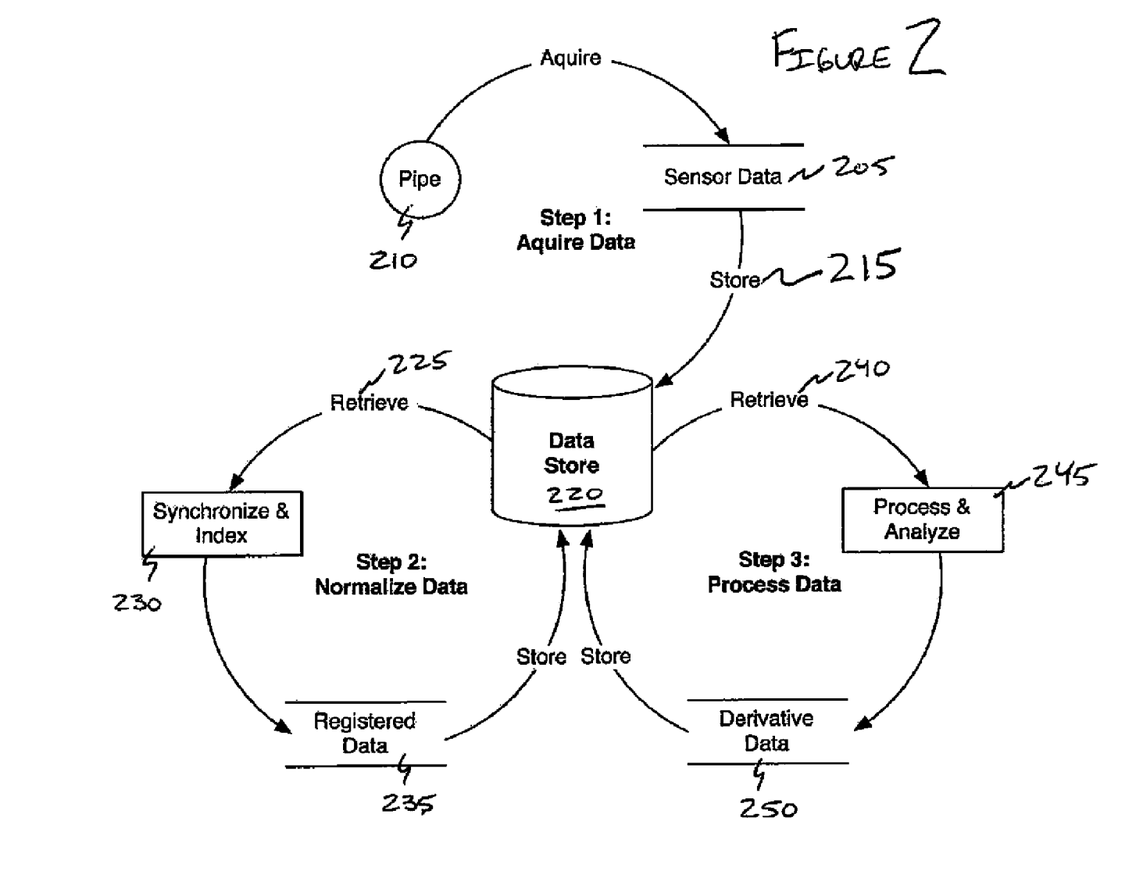
FIG. 2 is a flow diagram of the basic data acquisition and processing steps of the present invention.

As shown generally in FIG. 2, the first step in the process is to acquire the data from sensors and other sources. For example, sensor data 205 can be collected from sensors within a pipe 210. This directly sensed data is enhanced by non-sensed data (e.g., historical context data) as well as any meta-data or meta-tagging of the data that is desired. All of this sensed and non-sensed data is then stored 215 in a data store 220.

After storage in the data store 220, the data can be retrieved 225 for additional processing. For example, different streams of data that describe the same section of pipe may be synchronized and correlated to each other. Moreover, the streams of data may be discretized into a wide variety of "frames" of data as described above. In all, disparate types of data are sectioned and correlated for later use and analysis. These various frames can also be indexed according to common database techniques to facilitate later searching. After synchronization and indexing 230, the registered data 235 is then returned to the data store 220.

Finally, this registered data can, at a later-time, be retrieved 240 from the data store 220 for processing and analysis 245. As detailed below, a wide variety of querying and other data analysis techniques can be performed on the data. Newly-determined "derivative" data 250 can also be put back into the data store 220 for future processing.

As briefly described above, FIG. 3 shows an expanded version of the FIG. 2 data acquisition and processing methodology including an expanded view of the various data frames that are achievable through the present invention. In short, sensor data that is collected and referenced to the sensor itself is stored in the data store as "Level 1" data. This Level 1 data can be retrieved from the data store and then transformed, synchronized and indexed into "Level 2" data that is referenced to the robot or data collection platform. Finally, the data can be retrieved from the data store and transformed, synchronized and indexed into "Level 3" data that is referenced to the world. In this way, the flexibility of the data analytics (the processing and analysis of the various levels of stored data) is maximized.

In more detail, the FIG. 3 "Level 1" process illustrates how inspection data is collected. It involves inserting a robot or other platform equipped with analog and/or digital sensors into a pipe network for the purpose of determining pipe condition for follow-on action (e.g., further inspection, cleaning, or maintenance). At this level, data vectors contain all data from all sensors as obtained at discrete time intervals, and the data is globally indexed via time (not space). Individual sensor data is referenced to the sensor coordinate systems—either natural or artificial. This process disambiguates all sensor data and removes any illustrated or imagined bifurcation problems associated with space-based indexing of data.

In the "Level 2" step, the data is normalized to the robot. This step involves the synchronization, indexing and transformation of data in order to reference the data within a given frame spatially to the robot/platform. This represents the robot's reconstructed spatial view of the world at a given time. In other words, it places all time-indexed data frames into a spatial system. The complexity of this spatial system can vary widely. Specifically, primitive pipe inspection sensors use a simple linear coordinate system based on odometry or payout. As demonstrated in the examples herein, the spatial indices at this level of the present invention can be fully 1-dimensional (linear), 2-dimensional (planar), or 3-D, 6-D or beyond. This is the initial fusion step where data vectors are indexed spatially and fused.

In the "Level 3" step, the data is normalized to a general coordinate system called "world." This process involves establishing the relationship between data frames at different times. It enables the robot to have a history and view of the world. Note, this view is not necessarily a geo-referenced representation, although that is one example. Other examples include the registration of data to other data sets from the same location, e.g., as in time-based analysis. This step extends the spatial relationship established in Level 2 to a reference coordinate system of some complexity. It also extends the concept to include the macro-time concepts (discussed below). In sum, this process provides a space-time view of the pipe network that enables time-based analysis and prediction.

Finally, in FIG. 3, the "Data Analytics" section refers to algorithms of various types and complexity that attempt to provide information relative to questions about pipe condition. For example, "how much debris is in a selected pipe?," "how much corrosion is in the pipe?" or "when is the pipe going to fail?" As shown in FIG. 4, reports can be run on data at all levels providing a matrix of possible reporting levels.

Figure 4:
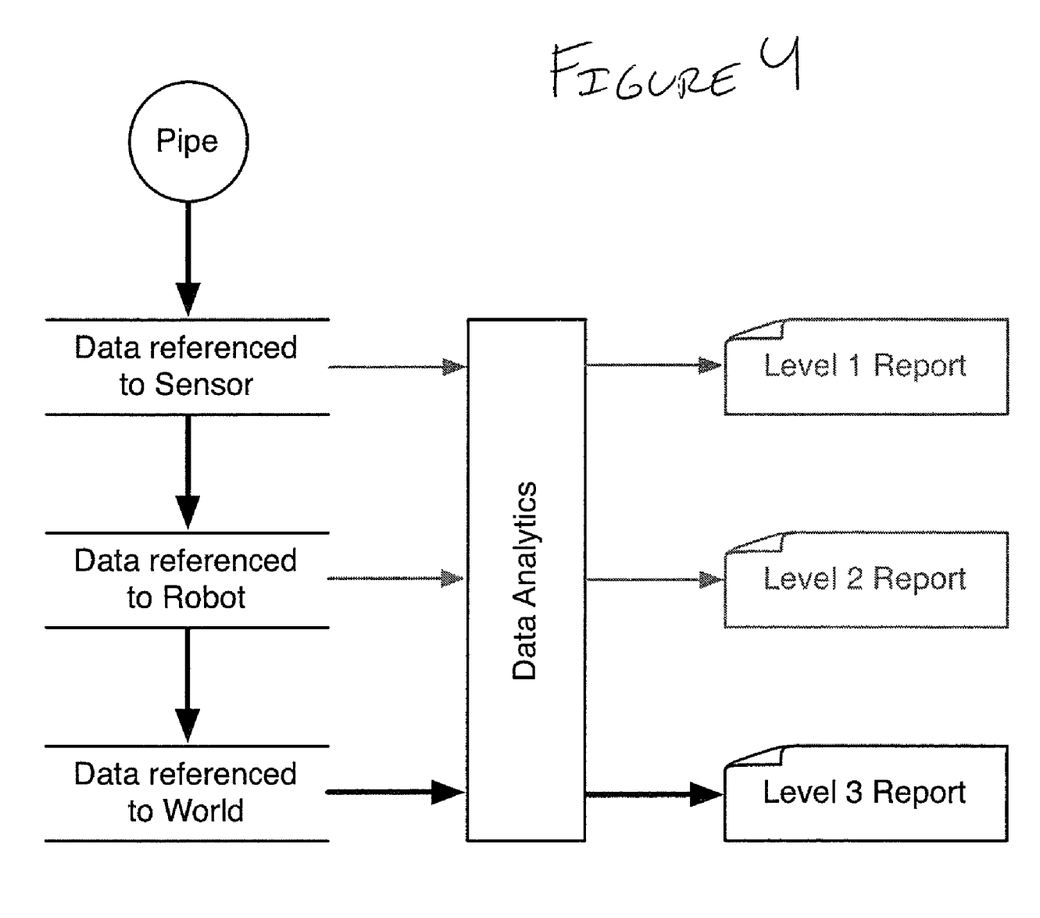
FIG. 4 is a flowchart showing various reporting features specific to different levels of data normalization.

FIG. 4 takes this concept one level further by detailing a generalized data flow process in which data analytics may be carried out on a wide array of stored data in all of its various forms. At its core, the FIG. 4 reporting method shows that the present invention provides the flexibility to process, analyze and report out the various results of these data analytic processes with respect to a variety of different data reference frames. By simultaneously characterizing and storing the data in such a flexible manner, search queries for different "levels" of data can all be carried out in a single system.

Turning back to the general method, the above-described data may be stored in a variety of forms. Data can be collected by a sensor assembly capable of sampling different types of information. The data is then packaged into a data frame. This data frame consists of a vector of concurrently-sampled data (i.e. the data in each data frame is correlated to the same temporal data). Each datum also optionally includes additional metadata representing knowledge about the data sources themselves, including, but not limited to, the data type, estimated error distribution, settings, or any fault conditions. These data can take any form or format. For instance, the frame might contain sonar range data, a temperature reading, pitch, roll, and an accurate time, as well as metadata describing the percentage of estimated error of the sonar range, the frequency of the sonar head, a nonlinear function for temperature error, and confidence values for pitch and roll.

Additionally, it is possible that some metadata may apply to groups of data values, a characteristic that can be further expressed by recursive levels of metadata. In other words, metadata can provide pointers or links to other data that in turn references other data and so on, ad infinitum. These data can come from sensor output or the data frames being produced by other sensor assemblies. The data frames collected by an assembly can either be sent to another sensor assembly, or to a data store that can archive the data frames.

Databases or "data stores" can be created to accumulate and index data frames from various inspections and/or various sensors. Data can be inserted into a data store by a sensor assembly, or moved between data stores. Source data is imported into the data store through a well-defined data interface, and is archived within it.

Archived data frames can then be cross-referenced and indexed to allow for queries and analysis of data meeting specified parameters. Because data frames can contain several dimensions of data, it is possible to index any set of frames by any of the data values shared by all of them, allowing for complex but precise cross-reference and correlation. For example, indexing can correlate all data frames associated with location X in pipe A (spatial data), or all data frames associated with mobile pipe networks that were moved within the last year (contextual data).

This indexing allows for dynamic statistical analysis of the relationships among any set of data sources over many inspection runs. This, in turn, makes it possible to correlate seemingly disparate data sources and create versatile environmental models. For instance, hydrogen sulfide gas levels might be correlated to temperature or time of inspection, and then further analyzed against temperature versus time of inspection. Another example compares flow speed data with the estimated error metadata of the sonar unit. The derived data from this analysis can then be reinserted into the data store for use in further analyses or exported to data consumers.

Data consumers, such as reports and viewers, extract source or derived data from the data store and use it to represent the state of the inspected pipes. A fusion of related data can graphically or qualitatively represent pipe conditions to the data consumer. This data is essentially synthesized from concatenated data values during inspection, and thus is not a direct representation of any particular sensor value. For example, a map of a pipe network might depict spatial, feature, and context data. Temporal data can be incorporated to depict trends or changes over time. Data from two inspections of different, but overlapping, sections of a pipe network can be fused to form a map of the entire network by correlating the spatial data from the overlapping sections.

Relevant data can be obtained by querying a multi-dimensionally indexed database across different data types. For example, a combined query based on spatial and feature data might return data on "all pipes in Pittsburgh (spatial data) with cracks greater than five inches (feature data)." A combined query based on spatial data and temporal data might retrieve data on "all data from the Apr. 6, 2006 pipe inspection (temporal data) in Squirrel Hill (spatial data)." Similarly, a query based on context data, spatial data, time and feature data might return data on "all pipes in Pittsburgh (spatial data) with average corrosion (feature data) greater than 3 inches and that have not been repaired (context data) in the last five years (time data)."

A wide variety of data analysis, including fusions, mathematical transformations, and/or statistics, can be done on this array of source data. For example, fusions and transformations can be executed by extracting a data set, applying a function to it, and creating a new data set. Moreover metadata stored in the data frames can be used to correct or alter sensor data values. Examples of such corrections or alterations include using error calculations to determine a set of upper and lower bounds for the actual position of a spatial sensor, or rescaling sonar ranges based on the unit's configuration data. This altered data set can be reinserted into the data store independently of the source data, preserving the source data while allowing the modified data to be reused in further analysis.

The above material sets forth a general description of the structure and use of the present invention. To more fully understand the features and advantages of the invention, several detailed examples of particular analyses (e.g., spatial analysis and temporal analysis) are provided below. Although these exemplary analyses are provided in distinct groups, their application is not limited to these particular data types or examples and the disclosed examples can also incorporate other disclosed features and embodiments described elsewhere herein.

Spatial Analysis

Spatial analysis can involve the mapping of pipe networks using mobile inspection platforms with sensors.

Sensing can be accomplished using imaging sensors such as cameras, lasers, or sonar. In prior systems, image data is correlated to distance data determined by tether payout sensors that describe a linear offset from the mobile platform's ingress point.

While such correlation of image data with linear offset data can describe a single pipe, such correlation cannot adequately describe large, complex, pipe networks that have many interconnected segments and joints. As a mobile platform passes any branch or fork in a pipe, linear offset data becomes ambiguous because the same linear offset distance will be associated with multiple points. For example, a point one foot past a branch in one direction will have the same linear offset as a point one foot past the same branch in another direction (See FIG. 1 and previous discussion).

Figure 5:
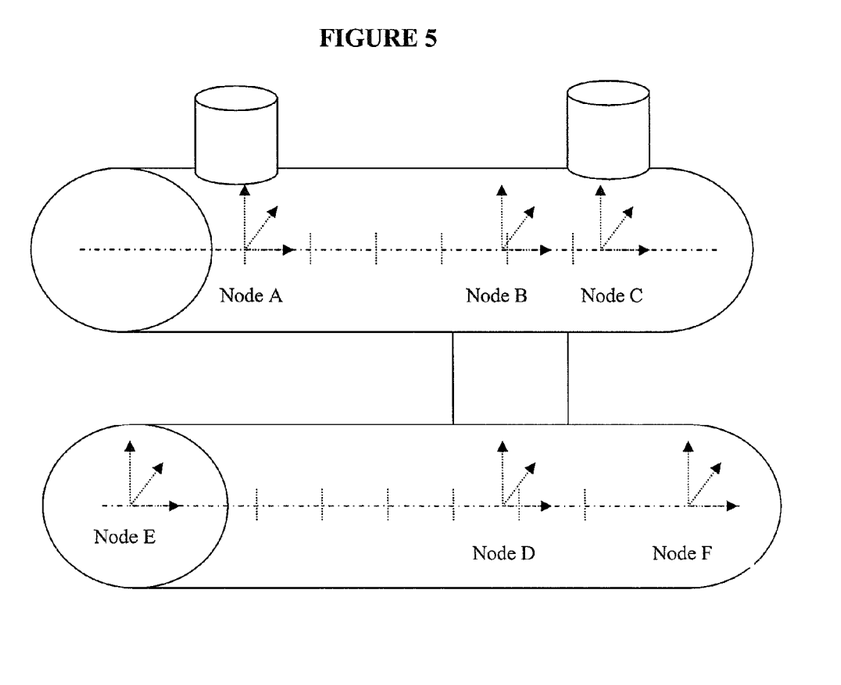
FIG. 5 shows a linear model of a complex pipeline network.

Such ambiguities can be resolved using, for example, a graph model that combines linear offset data with logical position data. The graph can be dynamically created by detecting "bifurcations" (or other multiples of branches) in sensor data and assigning a unique node identifier to each bifurcation point. Graphing a simple "Y" network provides an example. FIG. 5 shows a linear model of a complex pipe network, and FIG. 6 shows a graph-based representation of the same network.

Figure 6:
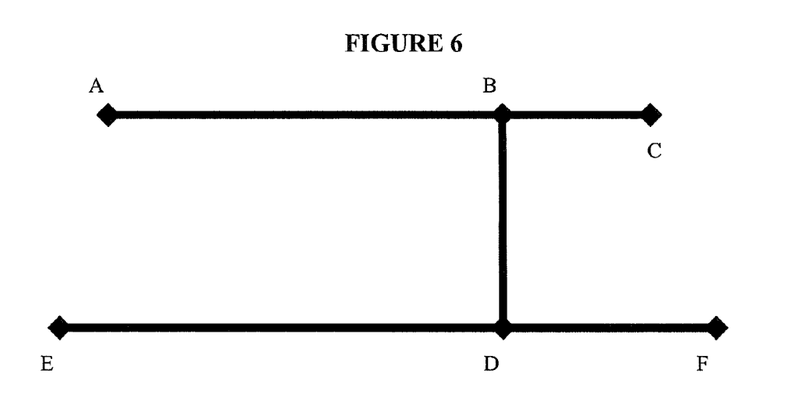
FIG. 6 shows a graphical model of a complex pipeline network.

The insertion point of a sensing robot is a node labeled "" in FIGS. 5 and 6. After moving straight ahead 1000 feet the robot encounters a junction. A new node "B" is inserted in the graph at the junction. Now the segment AB is 1000 feet long and represents an "edge" on the graph. The robot then travels an additional 250 feet straight ahead where it encounters a manhole that represents the terminal point of the inspection. A new node "C" is inserted into the graph, with segment BC 250 feet long and inline with segment AB. However, if instead the robot turned 90 degrees from its node B position and traveled 500 feet to the right, it would end up at node D. Here, a segment BD (in FIG. 6) shows this 90 degree turn. Similar nodes in the linear model (FIG. 5) and are graph model (FIG. 6) are also shown in the figures (i.e., node E and node F). Using this scheme, it is possible to completely map any subterranean pipe network.

Because multiple data samples taken at the same location with different sensor poses can yield disparate results, sensor pose can be recorded to better understand what the data represents, to correlate successive sensor samples, and to perform quantitative analysis of the sensor data. Spatial location is also important because the location of pipe segments can change due to ground settling or as a normal course of operation in the case of re-deployable pipe networks.

Pose sensors such as inertial measurement units (IMUs) measure pose relative to a reference pose in three spatial translational dimensions and three spatial rotational dimensions. The reference pose can be geo-referenced to correlate pose and sensor data samples to one another.

Spatial data can be recorded with time data indicating the time the data sample was taken. Time recording can be helpful for inferring temporal relationships in such samples or among other data sets. For example, data taken at a particular location at different micro-times (rapid collection of data) can be used to improve signal to noise measurements of sensors by dwelling at a given location for a period. Since this is micro-time, the infrastructure being imaged does not change during the timescale (no assumed change). At macro-time, however, temporal relationships are used to determine changes in the pipe network—since it is assumed that change occurs over time. These examples illustrate two types of fundamentally different inferences using the same data from the same place taken on different time scales.

Spatial data taken at different times and/or by different sensors is correlated by spatial registration. Spatial registration ensures that correlated spatial data involves data from the same location in a pipe by accounting for data error, differences in data collection instrumentation, and/or changes in relative pipe locations over time. For example, spatial data at location X collected from sensors on one mobile platform may correspond to a linear distance reading of ten feet, while spatial data collected at location X from another sensor or platform during a different inspection may correspond to a linear distance measurement of twelve feet.

Spatial registration accounts for this discrepancy to correlate spatial data from the same location. In at least one preferred embodiment of the present invention, data can be correlated by feature. For example, a particular pipe joint located at ten feet in a first scan might be recognized by manual or artificial means to be located at twelve feet in a second scan or data set. The two data sets can be correlated by offsetting the payout at this joint by two. This process is called "feature matching." Another process matches raw data. In this case, laser range data is used to compute a corresponding shift—this can be done in six degrees of freedom (a full spatial correlation). This process is called "scan matching." Feature and scan matching can be done on any data set or set of data sets in the aggregate.

The interpretation of results and subsequent analysis can change dramatically when accounting for the context of situation. For example, data sets may correlate spatially, but not contextually. In mobile pipe networks, time-based analysis is complicated because pipe segments may be replaced or moved between inspections. The result is that a new pipe segment might occupy the same space as the segment it replaced. Context-based analysis accounts for this change and compensates accordingly.

For example, suppose a simple linear pipe network is composed of three segments: A, B, and C. In the first inspection at time T1, the pipe is constructed such that segment A is inspected first, then B, and finally C. In the time between inspections, segment B is damaged and replaced with B'. Now, at time T2, the pipe is re-inspected. Pure spatial or temporal analysis is insufficient as it does not contain the information or "context" that segment B has been replaced with segment B'. Temporal analysis, e.g., change detection, without the context, recognizes the changes highlighted in segment A as changes to the same pipe segment over time—an important diagnostic tool. However, changes in segment B represent the differences between B and B'—not changes to pipe structure over time. This contextual difference impacts subsequent decision-making and analysis, and context-based analysis can account for this difference.

Contextual Analysis

Context is often the part of the data set that encodes a specific customer problem and provides guidelines on how to interpret the results of an inspection. For example, two inches of corrosion in one part of pipe might be insignificant. However, in another location within the same pipe, two inches of corrosion might demand immediate attention due to increased stress on the pipe at that location—from overburden, for example. The customer often provides this context. Context can also be provided by system operators, platform operators, site engineers, owner/operators, deployment technicians, reporting technicians, engineers, and the like.

Context-based analysis can thus provide a basis for predicting pipe performance, including expected locations for problems or failure. Other examples of contextual considerations include repair history, damage or problem history, soil type, local terrain, surface structures, population density, budget, pipe construction, pipe material, and local climate.

Context can also be a derivative of analysis, which means that an analysis can create context that can be inserted into data frames. For example, algorithms that grade pipe condition and determine pipe materials can create context. For example, an image processing algorithm could be used to detect lined pipes versus non-lined pipes. This derivative product of the algorithm—the classification, can be reinserted into the database to provide new context to old data (e.g., "derivative data"). This can happen long after inspections have been performed. Pipes can be re-inspected for years after an initial inspection with new algorithm and processing releases and capabilities.

Temporal Analysis

Figure 7:
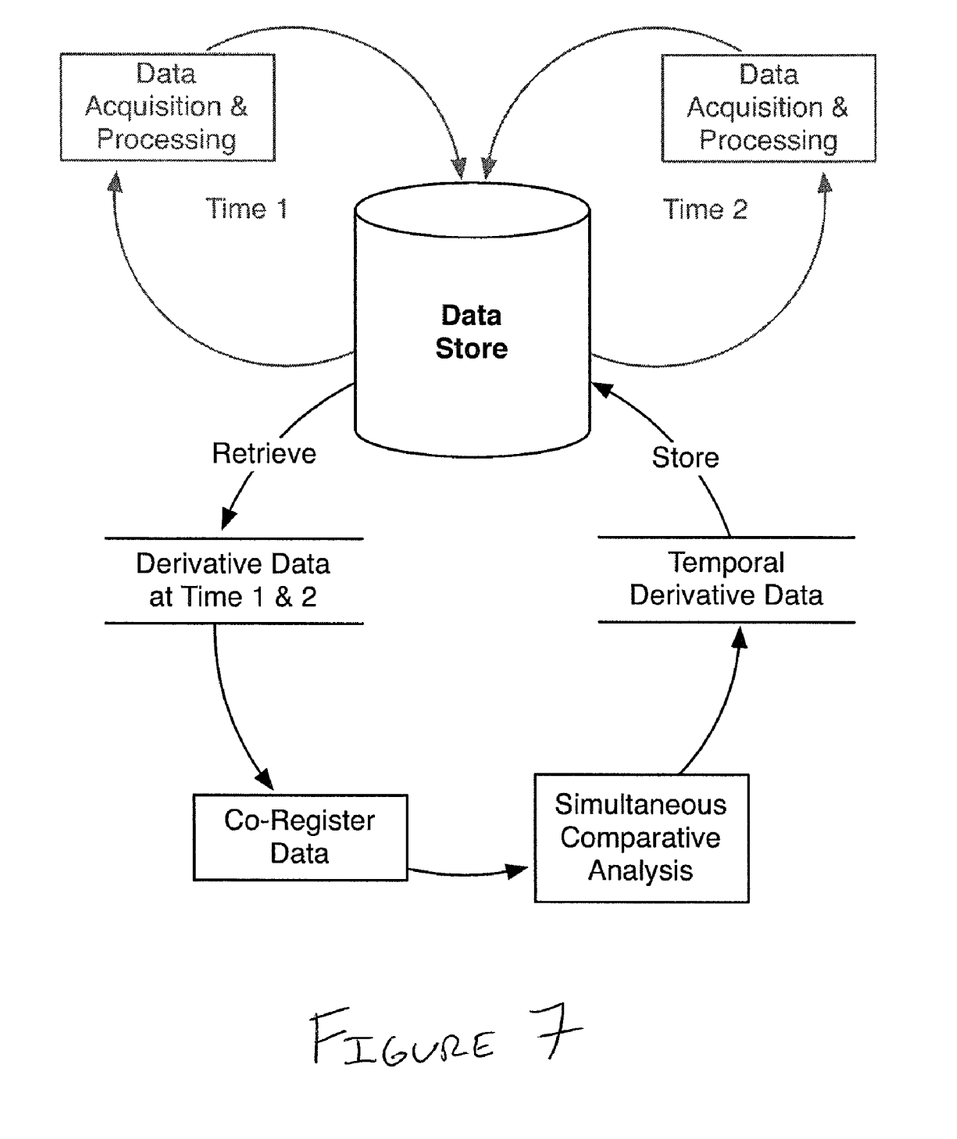
FIG. 7 illustrates a flow chart of a temporal data analysis.

Time-based analysis involves spatially-indexed data (linear-spatial indices such as payout is a simple form of this), and temporally-indexed data (each data point has a time-index associated with it). Data is indexed temporally with macro-time and micro-time indices. Time-based analysis is generally shown in FIG. 7.

Micro-time indices are time stamps derived at the milli-, micro-, or nano-second level, for example, that allow the temporal registration of data. Generally speaking, they represent time periods in which the pipe itself does not change. Micro-time indices may accurately account for sensor data acquired from a fast moving platform. Micro-time analysis is often utilized in the synchronization of disparate data sets and in the statistical operations on sensors of the same time such that signal to noise of the given sensor is improved.

One example of micro-time analysis is dwell scanning. Dwell scanning is the process of improving the readings available by enabling the sensor (either by physical or electronic means) to remove platform motion effects and improve signal to noise by correlating data obtained at the same location in space at different time intervals (usually micro-time intervals). An example of micro-time analysis with closed-circuit television is the temporal averaging of several different image frames obtained from a single viewpoint in order to remove the noise. An example with lasers is the temporal averaging of several different scans obtained from a single viewpoint in order to improve the range resolution.

Macro-time indices (e.g., hours, days, months, year, and minutes) are associated with some context that enables grouping of micro-data. Generally speaking, these are time periods in which the pipe itself may change (change assumed). For example, an initial pipe inspection may involve several deployments over several days. The micro-time indices are an insufficient means for associating data with the context of inspection. Therefore a macro-time index is necessary for grouping micro-data into a logical set that is suitable for macro-time analysis.

Macro-time analysis is the analysis of a pipe at two distinct periods of time. The period of time between inspections is usually measured in years; however, this time period might be shorter or longer depending on the application. Regardless of the interval, the analysis involves infrastructure that is known to have changed or assumed to have changed. Macro-time analysis, by comparing new inspection data with previous inspection data, might be used to measure changes as well as identify and localize defects.

Known changes might include a pipe collapse or rupture with manifestations visible on the surface. Known changes might also include quantified changes that result from human activities such as relining or repairing a pipe. Relining, for example, may result in a known amount of new material added to the inside of a pipe.

Assumed changes might include situations in which the time since the last inspection has been sufficiently long such that corrosion, punctures, ruptures, and/or other damage is expected to have occurred. Periodic pipe inspections using time-based analysis can identify defects that may lead to such damage before they are manifest externally. Earthquakes, landslides, or other natural phenomena may also lead to assumed changes. Assumed changes may also occur as a result of human activities such as relining, repair, or cleaning. For example, the amount of debris in a pipe is assumed to decrease following cleaning, but the actual amount of debris removed may be unknown.

Macro-time analysis can be used to research trends that lead to pipe damage or failures. For example, examination of pre-collapse inspection data from several pipe collapses can be used to determine common factors that might lead to collapse. Identifying these factors or other trends can then be applied to other pipes to predict risk of collapse.

Time-based analysis might also confirm intentional changes to pipes. For example, time-based analysis can verify details of maintenance operations such as cleaning, relining, or repair. In these cases, time-based analysis is used to ensure the work was executed to specification. For example, cleaning operations can be examined to determine whether the specified amount of debris was removed. In relining, time-based analysis can verify whether new lining of the appropriate thickness was installed without significant rippling or bubbling.

Generally, time-based analysis can be used to measure changes in corrosion, sediment accumulation, charge-level, gas concentration, confirmation of rework or repair, water quality, pH, and pipe features over time. This analysis can be pair-wise in the example where the time analysis examines inspections at two distinct macro-times (T1, T2) or it can analyze three (T1, T2, T3) or more (T1, T2, . . . TN) different time periods. Such a pair-wise analysis is detailed in FIG. 7. By extending time-based analysis out to N inspections, it is possible to establish and track trends and predict future changes. This is an important advantage over current systems.

Data collected from sensors can also be processed and classified into observed features such as infiltration defects or corrosion defects. Correlation of these features with spatial, temporal, and/or context-based data can be used to diagnose performance and make recommendations (predictions) at the system level. For example, observation of many defects concentrated in one part of a pipe network may lead to a recommendation for further investigation into possible localized problems in that part of the network. Similarly, an unusually large increase in system-wide defects from one inspection to a later inspection may lead to inquiry into potential system-wide problems. Observation of frequent defects in the same location despite repeated repairs may lead to a recommendation for a different repair strategy to prevent recurrence of the problem. Generally, the present invention can analyze an analysis done on pipe segments and then make inferences about the system from those piecewise analyses. This is another advantage over the prior art.

Some or all of these data sources can be combined into data frames which are multi-dimensional vectors of data samples that were observed concurrently. Relationships between these various data frames can be drawn by correlating overlapping dimensions (see FIG. 3). For example, data frames from an inspection that recorded pose and pipe corrosion information can be correlated to an inspection that recorded gas and pose information to infer a relationship between gas levels and corrosion in a pipe.

Observed data values are subject to error that must be accounted for in data analysis. The error of most sensors can be modeled by a bounded window or a probability distribution function that may be sensitive to other data such as temperature and vibration. It is important to include these error models at a fundamental level and take them into account at all levels of the data model. The error models can be incorporated into data analytics to compute a confidence level and error bound for derived data and statistical conclusions.

Drift in inertial measurement unit ("IMU") position estimates is an example of error modeling that may be incorporated into the data according to the present invention. For example, if a robot with an IMU starts at point A of an inspection, the position of the robot with respect to point A is known exactly. If the robot moves forward in a straight line for 100 feet (e.g., in the X axis), the real or ground truth position of robot is (100, 0, 0). Since an IMU is prone to drift, the position of the IMU might read, (95, 5, −2). Error modeling may indicate that the position of the robot that moved 100 feet in ten minutes is (95, 5, −2)±(5, 5, 5). This error data (±(5, 5, 5)) can be correlated with the spatial data (position of (95, 5, −2)) and the temporal data (ten minutes) within the data store. Because IMU drift accumulates, the error increases as the robot continues to move along during the inspection. Error data can be correlated to the spatial and temporal data associated with any particular position and time during the inspection.

This analysis depends greatly on the concept of probability and how uncertainty in sensing is modeled. In the present example, a data frame, sensor value, or data aggregate is not associated with a point as in the case: "image A was acquired at point P." Instead, the image is assumed to have been acquired in the region of point P with a defined probability distribution. On a 1-dimensional line, it is modeled as a Gaussian distribution (or other model) where P is the mean value and the image has actually been acquired anywhere on the line. However, as you get farther from point P, the probability of the image being acquired at the new point is increasingly lower and rapidly approaches zero. By modeling data in this way, and associating different distributions to different sensor values and aggregate values, it is possible to account for these uncertainties. Preferably, more accurate sensors have tighter distributions and receive increased weight in decision-making, processing, and data fusion algorithms.

Exemplary Data Collection Robots/Platforms

An exemplary embodiment of a data collector is an electronic sensor module which has a controller and one or more sensors for measuring the pose of the module and the state of the surrounding environment. The module may also optionally contain a rechargeable power source, a means for communication and/or a local data storage device. The controller samples some or all of the sensors concurrently and packages these concurrent data samples into data frames. The controller may log the data frames on the local data storage device and/or transfer the frames to an external data receiver or data store. The unit may also perform local manipulation, analysis and/or synthesis of the data frames.

A suite of sensors present on the sensor module may include some or all of (but is not limited to) the following: pose and proprioceptive sensors (e.g., inertial measurement units, accelerometers, gyroscopes, magnetometers, battery meters); environmental and exteroceptive sensors (e.g., laser range scanners (1D, 2D, 3D), structured light sensors, profiling and imaging sonars, radar, ground penetrating radar, ultrasonic sensors, cameras, flow meters, gas sensors, temperature sensors); or other sensors (e.g., clocks).

Another exemplary embodiment of a data collection platform is the same sensor module affixed to or integrated into a mobile robot that can (autonomously) propel itself through a subterranean network. The mobile robot allows the sensor platform to collect data as it moves through the network. The robot may also have a controller which can navigate the subterranean network by receiving commands from a remote operator or remote controller, or which can interface with the sensor module to perform autonomous navigation.

An example of such an embodiment is a robot with an integrated onboard sensor package which has a customizable sensor payload that is selected based on the properties of the subterranean network into which it is deployed. The robot is often deployed into sewers and tunnels with sensors including profiling and imaging sonars, 3D laser scanners, video and still cameras, flow meters, gas meters and temperature sensors. The robot also carries onboard pose sensors including an IMU, magnetometer and also a clock. The robot has multiple sensing and navigation controllers and either receives navigation and control instructions from a remote operator or controller or has an autonomous onboard controller for navigation.

Another exemplary embodiment has an integrated onboard sensor package which may include (but is not limited to) any or all of the aforementioned sensors. In this embodiment, an onboard controller performs autonomous navigation through the subterranean network based on sensor data and a mission plan. Depending on the application, the sensor payload may include a wide variety of sensor or only a single sensor. Sensor data is captured in concurrent frames by the controller and can be transmitted to a remote data receiver or logged for post-inspection retrieval. The robot can navigate autonomously using environmental sensors, pose sensors, or a combination of both. One example of the pose-based navigation is tilt-steering. This is a method that leverages the geometric regularity of round pipe to infer steering and navigation decisions from robot pitch and roll measured by a tilt sensor.

Another embodiment of a data collection platform is a multi-robot system comprised of a plurality of robots that work in tandem to collect data. Robot teams can be used in parallel to speed data collection and mapping of a subterranean network. They can also be used serially to re-traverse a portion of the network to corroborate data collected by other robots. When a robot encounters another robot which was traversing a different portion of the pipe network, the system has positive proof of a link between the two sub-networks and may join the two models to form a larger scope of the subterranean network.

Another embodiment is a fixed data collection platform. This platform can be used to perform continuous monitoring of environmental data in one location. Such a platform can also be deployed in a sensor network which utilizes a plurality of sensor platforms to collect local data from a variety of locations within a subterranean network. The distributed local data can be synthesized and analyzed to infer network-wide environmental information and statistical trends in the data.

Another embodiment is a passive mobility data collection platform that moves as it is subjected to forces present within the subterranean environment. For example, a buoyant sensor platform may be deployed into a fully—or partially-submerged subterranean network. The sensor platform floats through the network as the medium flows. It will collect data in a method similar to the other sensor platforms and may log or optionally transmit this data to an external data receiver. Another example of a passive mobility platform is a sensor module that is not necessarily buoyant but that supports itself by having a flexible exterior profile that conforms to the environment. Such a system could be deployed into a sewer or a gas pipeline and be directly propelled by the flow of the medium.

In one preferred embodiment of the present invention, multi-dimensional indexing can be represented in an electronic map with embedded data (e.g., video, laser, gas, accelerometer, gyro). The map contains hotlinks and information nodes for accessing data regarding a particular job, inspection, segment, point, etc. Maps may link to worksheets, reports, written summaries, hand drawings, sketches, notes, web pages, or other materials.

Another example is the registration of pipe data to a 2-dimensional topo, vector, or overhead image map. All data can be indexed into time-space-context maps that are constructed from the MDI database and can be correlated with commercial map-based products, like Google Earth, Geographic Information Systems (GIS), or Microsoft Live. Maps can also be referenced to engineering drawings, hand sketches, photographs, topo-maps, relief maps, or the like.

Since maps themselves can be constructed from the MDI database, they can have temporal components as well. For example, reports (processed data) can include maps that have temporal components—providing a 4-dimensional view of the world. For example, this approach to data presentation enables time-based reports that can be updated remotely and changed to reflect new information.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method, implemented at least in part by a computing device having one or more processors, for managing a multi-dimensional data system, the method comprising the steps of:
   collecting first pipe data of a first type at a first location and at a first time;
   collecting second pipe data of a second type at a second location and at a second time;
   processing said first and second data such that the first and second data have a common 3-dimensional spatio and temporal reference frame, wherein said processing is performed by the computing device;
   storing said processed data in a data store; and
   analyzing said stored data.

2. The method of claim 1, wherein said common 3-dimensional spatio and temporal reference frame is based upon a sensor with which the first pipe data was collected.

3. The method of claim 1, wherein said common 3-dimensional spatio and temporal reference frame is based upon a platform from which a first sensor collected said first pipe data and a second sensor collected said second pipe data.

4. The method of claim 1, wherein said common 3-dimensional spatio and temporal reference frame is based upon a world coordinate system external to the pipe.

5. The method of claim 1, wherein said common 3-dimensional spatio and temporal reference frame is three different reference frames, and
   further wherein a first common 3-dimensional spatio and temporal reference frame based upon a sensor with which the first pipe data was collected,
   further wherein a second common 3-dimensional spatio and temporal reference frame based upon a platform from which a first sensor collected said first pipe data and a second sensor collected said second pipe data; and
   further wherein a third common 3-dimensional spatio and temporal reference frame is based upon a world coordinate system external to the pipe.

6. The method of claim 1, wherein said collecting steps include the direct collection of data via sensing.

7. The method of claim 1, wherein said collecting steps include the collection of non-sensed data.

8. The method of claim 1, wherein said processing step further comprises the step of multi-dimensionally indexing the processed data to facilitate a user query of the data.

9. The method of claim 1, wherein said analyzing step includes the steps of
   creating derivative data based upon said analysis, and
   storing said derivative data back into the data store.

10. The method of claim 1, wherein said first location and said second location are the same spatial location, and the first and second times are different from each other but are of similar scale (macro or micro).

11. The method of claim 1, wherein said first and second times are the same.

12. A method, implemented at least in part by a computing device having one or more processors, for managing a multi-dimensional data system, the method comprising the steps of:
   gathering source data in spatial, temporal and contextual format related to a pipe segment;
   synchronizing said gathered sensor data with existing data of another type, wherein the synchronizing is performed by the computing device;
   multi-dimensionally indexing said synchronized data; and
   analyzing said data.

13. The method of claim 12, wherein said source data is directly gathered from a sensor.

14. The method of claim 12, wherein said source data is gathered from a non-sensing source.

15. The method of claim 12, further comprising the step of: Incorporating metadata into said source data.

16. The method of claim 12, wherein said temporal data is micro-time data.

17. The method of claim 12, wherein said temporal data is macro-time data.

18. The method of claim 12, wherein said source data further comprises uncertainty data.

19. The method of claim 12, wherein said source data further comprises feature data.

* * * * *